Figure 1:
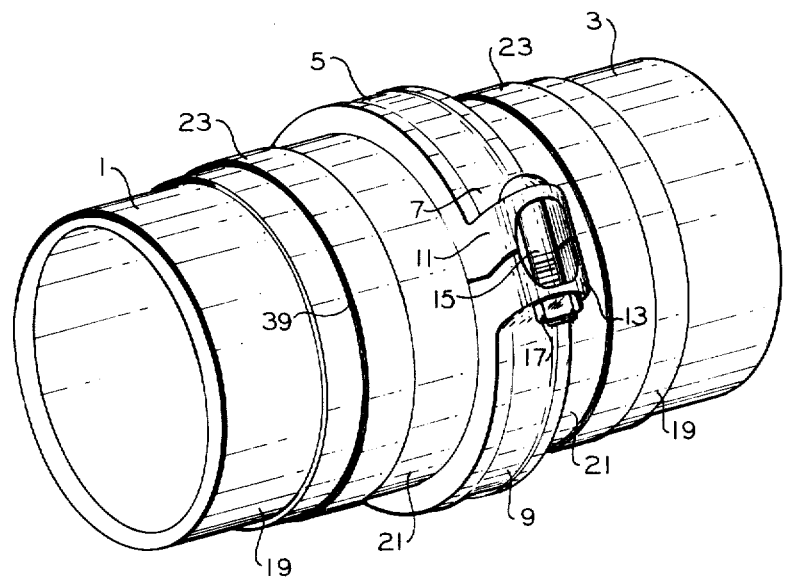

United States Patent [19]

Wood et al.

[11] 4,039,210
[45] Aug. 2, 1977

[54] COUPLING ADAPTER FOR PLASTIC PIPE

[75] Inventors: Roy F. Wood; Ralph A. Wynne, both of Dallas, Tex.

[73] Assignee: Phillips Petroleum Company, Bartlesville, Okla.

[21] Appl. No.: 700,437

[22] Filed: June 28, 1976

[51] Int. Cl.$^2$ .................................. F16L 17/04
[52] U.S. Cl. ........................... 285/112; 29/517; 138/109; 285/291; 285/373; 285/423
[58] Field of Search ............. 285/112, 288, 381, 423, 285/291, 21, 373, 367, 286; 29/517, 516, 521; 228/120; 138/109

[56] References Cited

U.S. PATENT DOCUMENTS

| 2,944,839 | 7/1960 | Anderson | 285/112 X |
| 2,998,269 | 8/1961 | Houghton | 285/112 X |
| 3,291,506 | 12/1966 | Blakeley | 285/112 |
| 3,406,986 | 10/1968 | Jennings | 285/21 |
| 3,695,638 | 10/1972 | Blakeley | 285/112 |

FOREIGN PATENT DOCUMENTS

| 701,311 | 1/1965 | Canada | 285/112 |
| 1,162,842 | 4/1958 | France | 285/291 |
| 1,232,741 | 5/1971 | United Kingdom | 285/381 |

*Primary Examiner*—Thomas F. Callaghan

[57] ABSTRACT

A means for adapting the end of a plastic pipe for coupling is provided in which the pipe is recessed circumferentially and the recessed area is further indented with three circumferential grooves. A first metal sleeve is shrink-fitted into the recessed area adjacent to the first groove furthest removed from the end of the pipe and further removed from the end of the pipe than this groove. A gasket ring of resilient material is inserted into a second groove which is between the first groove and the end of the pipe. A second metal sleeve having the same outside circumference as the third metal sleeve is shrink-fitted into the recessed area adjacent the first groove, encasing the gasket ring in the second groove, and indented into a first groove near the end of the pipe leaving a circumferential indentation spaced from the end of the pipe to receive one portion of a coupling device. A split locking ring having the same outside circumference as the first metal sleeve is inserted in the first groove and a third metal sleeve having an inner circumference sufficient slidably to engage the outer circumference of the first metal sleeve is slipped into position encasing the lock ring in the groove and overlapping the other two sleeves. Upon fixably attaching the third sleeve into position the plastic pipe is effectively covered with a metal adapter so that upon juxtaposition of two such adapted pipes a gasketed, split-ring coupling can be positioned into the grooves in the metal sleeves of the abutted pipe to lock the pipe in pressure-tight union.

7 Claims, 2 Drawing Figures

U.S. Patent  Aug. 2, 1977  4,039,210

COUPLING ADAPTER FOR PLASTIC PIPE

BACKGROUND OF THE INVENTION

This invention relates to plastic piping. In one of its aspects this invention relates the joining of plastic piping. In another of its aspects this invention relates to quick coupling of piping. In another of its aspects this invention relates to the fitting of plastic pipe with metal sleeves suitable for use in coupling operations.

The use of plasic pipe has been greatly increased in recent years finding application in many of the uses formerly confined to metal pipe. Plastic pipe now is used for conveying fluids, both gases and liquids, and even for electrical-duct work.

The usual method for joining plastic pipe is by fusing pipe ends together with a fusion machine. A fusion machine has the inherent shortcomings of the necessity of a power source and of being sufficiently bulky that the use of these machines is prohibited in close quarters. Because of these shortcomings, systems have been developed for quick-coupling of plastic pipe.

Among the most advantageous of th quick-coupling methods developed up until now is the coupling set forth in U.S. Pat. No. 3,695,638, utilizing a mechanical clamp-type coupling that keys into circumferential grooves at the end of the pipes to be coupled holding a gasket between the keys and against the abuttment of the coupled pipes. Such a coupling provides a pressure-tight seal and is at the same time resistant to being pulled apart by shrinkage and expansion of the piping.

The present invention provides for adapting plastic pipe with a metal sleeve so that an even more secure coupling can be obtained using a mechanical clamp coupling device of the type set forth in U.S. Pat. No. 3,695,638

It is therefore an object of this invention to provide plastic pipe adapted for coupling with mechanical clamp-type coupling devices. It is another object of this invention to provide a method for producing pipes adapted for coupling with mechanical clamp-type coupling devices. It is still another object of the invention to provide means for adapting plastic pipe to be coupled with pipes of the other materials of construction.

Other aspects, objects and the various advantages of this invention will become apparent to those skilled in the art upon reading the specification and the appended claims.

STATEMENT OF THE INVENTION

According to this invention a plastic pipe adapted for coupling is provided. The plastic pipe is recessed circumferentially on its outside surface near the coupling end with the recess suitable to retain a sleeve and with the recess further indented with three circumferential grooves. The first groove furthest removed from the coupling end of the pipe has inserted therein a split locking ring of sufficient dimensions substantially to fill the first groove and extend outward to the outer circumference of the metal sleeves which it will abut. A gasket ring of resilient material is inserted in and substantially fills a second groove. A first metal sleeve is inserted in the recess so that it extends from abuttment with the locking ring toward the end of the recess furthest removed from the coupling end of the pipe. A second sleeve of substantially the same outer circumference as the first metal sleeve is inserted in the recess extending from the lock ring toward the end of the recess nearest the coupling end of the pipe. The second metal sleeve encases the gasket ring in the second groove and is indented to fit into a third groove, the third groove being nearest the coupling end of the pipe, retaining the circumferential grooved configuration and with the third groove spaced from the coupling end of the pipe to be keyed with a mechanical clamp-type coupling. A third metal sleeve having an internal section sufficient slidably to engage the outer circumference of the first metal sleeve is positioned around the first and second metal sleeves encasing the lock ring and overlapping the first and second sleeves.

In one embodiment of the invention a method is provided for adapting the plastic pipe set out above. A circumferential recess is formed on the outside surface of the pipe and this recessed area is further treated to form three circumferential grooves on the outside surface of the pipe. A first metal sleeve is inserted in the recess extending away from the groove furthest removed from the coupling end of the pipe. A split locking ring is inserted in the groove furthest removed from the coupling end of the pipe and a resilient gasket ring is inserted in the middle groove. A second metal sleeve is inserted in the recess abutting the lock ring and encasing the gasket ring in the middle groove. A second metal sleeve is indented so that it fits into the third groove, the groove nearest the coupling end of the pipe, retaining the grooved configuration. A third metal sleeve is slidably positioned encasing the lock ring and overlapping the first and second metal rings and this third metal sleeve is then fixed into position. It can readily be seen that the order in which the elements of the invention are put into position is important. The resilient gasket must be in position before the second metal sleeve is positioned and both the first and second metal sleeves and the lock ring must be positioned before the third metal sleeve can be put into place.

In another embodiment of the invention a plastic pipe coupled with another pipe of the same external dimensions is provided by locking a plastic pipe adapted by the process of this invention into coupled position with another pipe using a mechanical clamp-type coupling of the type set out in U.S. Pat. No. 3,695,638. The coupled pipes can be two plastic pipes adapted by the process of this invention or can be a plastic pipe adapted according to this invention locked into position with a suitably grooved pipe made of any material of physical properties appropriate for construction of a pipe that can be suitably grooved.

The metal adapter of this invention is suitable for use with any plastic pipe or pipe of other flexible material of construction that in itself has physical properties that would be troublesome to couple by clamping grooved pipe ends. Although the invention is useful for piping of large sizes of 36 inch diameter or more, it is most useful for adapting piping of 6 inch diameter or less. The metal sleeves are indented to give sufficient strength to the coupling end of the pipe to provide a pressure-tight coupling using a gasketed mechanical clamp-type coupling that is resistant to pulling apart due to shrinkage and expansion of the pipe. Among such materials are various grades of polyethylene, other polyolefins, polyvinylchloride, and nylon. As noted before, adapted piping of different materials of construction can be joined by the method of this invention.

In adapting piping according to this invention the sleeves can be fitted into place by cooling the piping to cause sufficient shrinkage to allow the metal sleeves to be slid into place. The metal sleeve that encases the lock ring and overlaps the other two metal sleeves can be fixed into place by tack welding or using a tapping screw or rivet to penetrate with the encasing sleeve and one of the overlapped sleeves or the lock ring thereby uniting the two. The lock ring used in this invention is a metallic ring sized to fit the lock ring groove and cut into a plurality of pieces for easy fitting into the groove.

The resilient gasket will be an O-ring type of sufficient size substantially to fill the gasket groove. Any resilient material of construction is appropriate that is compatible for use with the piping. Rubber and the various resilient plastics are among the suitable materials.

Various metals and alloys of metals can be used in fashioning the metal sleeves used in this invention. The metal can be suited to the end use service of the plastic pipe so that upon contacting spillage a minimum of problems of corroding the metal will be encountered. The sleeves will usually be made of steel.

Figure 2:
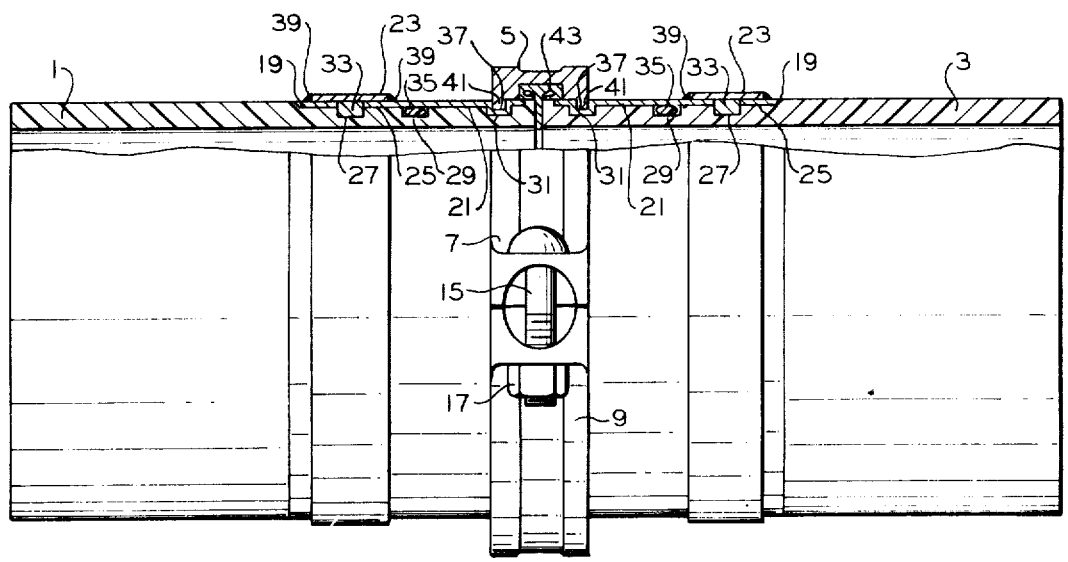

It has been stated that the plastic pipe is adapted according to this invention to be used with a mechanical clamp-type coupling as set forth in U.S. Pat. No. 3,695,638. This coupling can be described as a cylindrical segmented coupling housing comprising internal circumferentially keyed sections designed to match external circumferential grooves in piping ends paired for coupling. The coupling housings overlie a resilient gasket that is forced into pressure-tight relationship with the juxtaposed pipe ends by tightening of the plurality of coupling sections together to form a clamping ring. The plurality of coupling sections are usually brought together and fixed in a cylindrical position using bolts passed through complementary ears on the coupling sections and fixed in position by nuts. The invention can best be understood with the aid of the drawings in which FIG. 1 is a perspective view of piping coupled using the method and apparatus of this invention and FIG. 2 is a side view and partial cut-away view of piping coupled using the method and apparatus of this invention. Referring now to FIG. 1 the end of a plastic pipe 1 has been aligned with the end of another plastic pipe 3 and locked into coupled position using a mechanical clamp-type coupling 5. The coupling 5 consists of two segments 7 and 9 with each segment ending in complementary protruding ears 11 and 13 through which a bolt 15 is inserted and tightened into the threads of a nut 17.

The method for adapting the plastic pipe for coupling and the adapted pipe are best shown in FIG. 2 in which the adapted, coupled pipes are shown in cut-away view. Referring to FIG. 2, the plastic pipes 1 and 3 have cut therein a circumferential recess 25. Within this circumferential recess 25 are cut further indentations: a first circumferential groove 27, a second circumferential groove 29, and a third circumferential groove 31. Although the grooves are shown here to be of equal size, such sizing is not necessary as long as the function of the grooves is carried out.

In the construction of the adapted pipe a short metal sleeve 19 is fitted into the portion of the recess 25 stretching from groove 27 to the limits of the recess furthest removed from the coupling end of the pipe. The fitting of the metal sleeve is best done by cooling the pipe so that it shrinks sufficiently to allow implacement of the sleeve which is then held in place by the expansion of the plastic as it returns to room temperature.

A segmented locking ring 33 which substantially fills the first groove 27 and a resilient gasket 35 substantially filling the second groove 29 are put in place.

A fitted metal sleeve 21 extending from the first groove 27 and encasing the resilient gasket 35 in the second groove 29 is put into place in a manner similar to the implacement of sleeve 19. Sleeve 21 is shaped to encase the resilient gasket in its groove and also to fit into the third groove 31 retaining a circumferential groove 37 on the sleeve's exterior surface. Although it is preferred that first and second metal sleeves and the locking ring be sized so that the external circumference of these components is the same as the external circumference of the pipe being be adapted, the invention will be operable as long as the metal sleeves and locking ring are of the same external circumference. Over this external circumference is slid a third metal sleeve 23 which is positioned to encase the locking ring 33 and overlap the first metal sleeve 19 and second metal sleeve 21. This encasing metal sleeve 23 is then fixed into place using welds 39 to affix sleeve 23 to an underlying sleeve 19, 21 or the locking ring 33. Sleeve 23 and can also be held in place by screws or pins.

The adapted piping is now in condition for coupling. Two adapted ends 1,3 are juxtaposed and a mechanical clamp-type coupling 5 is fitted into place overlying a resilient gasket 43. The resilient gasket 43 covers the juxtaposition of the adapted pipe and is pressed into pressure-tight seal by locking the clamp-type coupling 5 into position with its internal circumferential projections 41 inserted into the complementary circumferential grooves 37 of the adapted pipe. The clamp-type coupling 5 is sized to mate its internal circumferential projections 41 with the circumferential grooves 37 of the adapted pipe. As the clamp-type coupling 5 is drawn into locking alignment, pressure is applied to the overlying gasket material 43 to form a tight seal with the aligned pipe ends.

In perspective view as shown in FIG. 1, the coupled pipe displays only the metal sleeves 19, 21 with the encasing metal sleeve 23 fixed into place by means such as welds 39 and the overlying clamp-type coupling 5.

This adapting provides means for coupling resilient pipe that otherwise would tend to expand or shrink under operating conditions so that there would be probability of leakage at the coupling. The adapting means also allows resilient plastic piping to be coupled to metal, ceramic, glass or other rigid materials that can be grooved to accept the clamp-type couplings used in this invention. We claim:

1. A plastic pipe adapted for coupling with a clamp-type coupling, said adapted pipe comprising:
    a. said pipe recessed circumferentially on its outside surface near its coupling end suitably to retain a sleeve within the recess and further indented within said recessed area with three circumferential grooves;
    b. a split locking ring inserted in a first groove furthest removed from the coupling end of pipe, said locking ring of dimensions substantially to fill said first groove;
    c. a gasket ring of resilient material inserted in and substantially filling a second groove;
    d. a first metal sleeve of substantially the same outer circumference as said locking ring, said first sleeve inserted in said recess and extending from abuttment with said locking ring toward the end of the recess furthest removed from the coupling end of the pipe;

e. a second metal sleeve of substantially the same outer circumference as said locking ring,, said second sleeve inserted in said recess and extending from abuttment with said locking ring toward the end of the recess nearest the coupling end of the pipe, said second sleeve encasing the gasket ring in the second groove and indented to fit into a third groove retaining the grooved configuration, said third groove nearest to the coupling end of the pipe and spaced from this end to receive a coupling device; and f. a third metal sleeve of inner circumference sufficient slidably to engage the outer circumference of said first and second metal sleeves, said third sleeve fixed into position encasing the locking ring and overlapping the first and second sleeves.

2. A plastic pipe of claim 1 wherein the outer circumference of said first and second sleeves is substantially the same as the outer circumferencce of the plastic pipe.

3. A plastic pipe of claim 1 wherein said third metal sleeve is affixed to at least one of said split locking rings, said first metal sleeve and said second metal sleeve.

4. A plastic pipe of claim 3 wherein the third metal sleeve is fixedly adapted by means selected from among rivets, tapping screws, and welding.

5. A coupled plastic pipe comprising a pair of plastic pipes adapted to coupling according to claim 1, said pipes aligned in coupling position and held in said position with a split ring comprising a circular band with two inward projections keyed into a groove of an adapted plastic pipe, said band overlying and retining a gasket sealing the coupling joint.

6. A coupled pipe of claim 3 comprising a split ring united by bolts passing through aligned projections on portions of said ring.

7. A method for forming an adapted plastic pipe of claim 1 comprising:
 a. forming said recess and said three grooves in the outside surface of a pipe;
 b. inserting said first metal sleeve;
 c. inserting said locking ring and said gasket ring;
 d. inserting said second metal sleeve;
 e. slidably positioning said third metal sleeve; and
 f. fixing said third sleeve in position.

* * * * *